(12) United States Patent
Lee

(10) Patent No.: US 9,497,033 B2
(45) Date of Patent: Nov. 15, 2016

(54) METHODS SYSTEMS AND COMPUTER READABLE MEDIA FOR PROVIDING REAL TIME DATA NETWORK USAGE INFORMATION USING SUBSCRIPTION PROFILE REPOSITORY (SPR)

(71) Applicant: Oracle International Corporation, Redwood Shores, CA (US)

(72) Inventor: Joseph Wonseok Lee, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 323 days.

(21) Appl. No.: 14/085,779

(22) Filed: Nov. 20, 2013

(65) Prior Publication Data

US 2015/0139040 A1    May 21, 2015

(51) Int. Cl.
*H04L 12/14* (2006.01)
*H04M 15/00* (2006.01)
(Continued)

(52) U.S. Cl.
CPC ....... *H04L 12/1414* (2013.01); *H04L 41/0893* (2013.01); *H04L 67/30* (2013.01); *H04M 15/59* (2013.01); *H04M 15/66* (2013.01); *H04M 15/8214* (2013.01); *H04M 15/83* (2013.01); *H04M 15/835* (2013.01); *H04M 15/8353* (2013.01); *H04M 15/85* (2013.01); *H04M 15/853* (2013.01); *H04M 15/857* (2013.01); *H04L 12/1403* (2013.01); *H04L 12/1435* (2013.01); *H04L 12/2602* (2013.01)

(58) Field of Classification Search
None
See application file for complete search history.

(56) References Cited

U.S. PATENT DOCUMENTS 8,565,722 B1    10/2013   Cheuk et al.
8,799,490 B2 *  8/2014    Ayers .............. H04L 29/12113
                                             709/229

(Continued)

FOREIGN PATENT DOCUMENTS

EP    2 249 514 A1    11/2010
EP    2 493 222 A1    8/2012

OTHER PUBLICATIONS

Notification of Transmittal of the International Search Report and the Written Opinion of the International Searching Authority, or the Declaration for International Application No. PCT/US2014/066239 (Mar. 30, 2015).

(Continued)

*Primary Examiner* — Michael Thier
*Assistant Examiner* — Brian Cox
(74) *Attorney, Agent, or Firm* — Jenkins, Wilson, Taylor & Hunt, P.A.

(57) ABSTRACT

A method for providing real time data network usage information using an SPR includes receiving a request for real time data network usage information. The method further includes, in response to the request, effecting a data change for the subscriber in the SPR. The method further includes, at the SPR, in response to the data change, sending a notification of the change to a policy and changing rules function (PCRF). The method further includes, at the PCRF, in response to the notification of the data change, requesting real time data network usage information from at least one policy and charging enforcement function (PCEF) serving the subscriber. The method further includes, at the PCRF, receiving the data network usage information from the at least one serving PCEF. The method further includes providing an indication of the real time data network usage information to the SPR.

17 Claims, 10 Drawing Sheets

(51) Int. Cl.
*H04L 29/08* (2006.01)
*H04L 12/24* (2006.01)
*H04L 12/26* (2006.01)

(56) References Cited

U.S. PATENT DOCUMENTS

| | | | | |
|---|---|---|---|---|
| 2009/0068984 A1* | 3/2009 | Burnett | ............... | H04M 1/663 |
| | | | | 455/408 |
| 2012/0166618 A1* | 6/2012 | Dahod | ............... | H04L 47/20 |
| | | | | 709/224 |
| 2012/0218888 A1* | 8/2012 | Cutler | ............... | H04W 76/02 |
| | | | | 370/230 |
| 2012/0233325 A1* | 9/2012 | Zhou | ............... | H04L 12/1407 |
| | | | | 709/224 |
| 2013/0258849 A1 | 10/2013 | Sharma et al. | | |

OTHER PUBLICATIONS

"3rd Generation Partnership Project; Technical Specification Group Core Network and Terminals; Sh Interface based on the Diameter protocol; Protocol details (Release 12)," 3GPP TS 29.329, V12.1.0, pp. 1-23 (Jun. 2013).

\* cited by examiner

METHODS SYSTEMS AND COMPUTER READABLE MEDIA FOR PROVIDING REAL TIME DATA NETWORK USAGE INFORMATION USING SUBSCRIPTION PROFILE REPOSITORY (SPR)

TECHNICAL FIELD

The subject matter described herein relates to providing real time data network usage information to data network subscribers. More particularly, the subject matter described herein relates to methods, systems, and computer readable media for providing real time data network usage information using an SPR.

BACKGROUND

In data communications networks, it is desirable for data communications networks subscribers to be able to obtain, in real time, current data network usage information. For example, if a data network subscriber subscribes to use five gigabytes of data per month, it may be desirable for the subscriber to be able to obtain, in real time, the subscriber's current data network usage, so that the subscriber can purchase data capacity and/or change his or her data network usage behavior.

One approach for providing data network usage information may be to use a subscription profile repository (SPR). In long term evolution (LTE) networks, the SPR stores a subscriber's data network usage profile, i.e., the data allocation to which the subscriber subscribes and also usage information. However, the usage information in SPR is typically only updated when a data network session terminates. It may be desirable for the subscriber to obtain data network usage information in real time while the subscriber is participating in one or more data network sessions. Waiting until session termination to obtain this information may not be desirable in some instances.

Another option for providing data network usage information to a subscriber may be to obtain the data network usage information from the policy control and enforcement function (PCEF). However, the PCEF that serves a particular subscriber is determined dynamically. An information technology (IT) system that a subscriber contacts to obtain network usage information may not have current PCEF information for a subscriber. Thus, having an IT system obtain data network usage information directly from the PCEF may not be possible due to the lack of knowledge of the serving PCEF. It is also not desirable to retrieve fast changing dynamic state data (such as current byte count of a session) using an IT interface.

Even if the PCEF could be queried by an IT system for a subscriber's data network usage information, the PCEF may not have a complete view of the subscriber's data network usage allocation. In this scenario, the PCRF is the usage manager, the PCEF is the usage tracker, and the SPR is the long term storage of usage information. When a user session first comes up, the usage manager reads from storage the usage information and calculates what's available for the session. For example, a subscriber's the monthly limit may be 5 GB and the subscriber has used 1 GB. So the usage manager (the PCRF) knows that 4 GB is available for the user session. The PCRF may not allocate the entire amount to the usage tracker (the PCEF). The PCRF may allocate to the tracker 100 MB to be tracked. When the subscriber uses up the amount, 100 MB, the tracker reports it to the manager, which may then allocate another 100 MB chunk. It may happen a few times during the life time of the session. Continuing the example here, the subscriber may be using the 4th 100 MB chunk. The usage manager is the only one that knows this—1.3 GB of the monthly allowance is used and the user is in the process of consuming another 100 MB chunk. Even if the IT system is able to connect to the PCEF and retrieve the snapshot, the only thing the IT system can identify is how much of the 100 MB chunk is used, e.g., 60M. On the other hand, the PCRF as the usage manager will perform necessary calculations of the previous chunks consumed before writing the final value to the SPR. Thus, contacting the PCEF alone may not provide a complete picture of the subscriber's data network usage.

Yet another problem of obtaining usage information directly from a PCEF is that the user may have multiple concurrent sessions served by different PCEFs. In such a case, if the IT system contacts a single PCEF, the IT system will not have all of the subscriber's current network usage. For a direct interface to provide an accurate usage count, the IT system would be required to have direct interfaces to any PCEF that could possibly serve a subscriber. Such a solution is not scalable or practical.

Providing current data network usage information may be useful to a subscriber and a network operator. For example, if the current session will cause the subscriber to exceed his data allocation, the subscriber may wish to have this information during the session so that the subscriber can terminate the session or purchase additional data network capacity. The network operator may desire to offer the subscriber the opportunity to purchase additional data network usage quota before the current quota is exceeded.

Accordingly, in light of these difficulties, there exists a need for methods, systems, and computer readable media for providing real time data network usage information using an SPR.

SUMMARY

The subject matter described herein relates to methods, systems, and computer readable media for providing real time data network usage information using an SPR. One method includes receiving a request for real time data network usage information. The method further includes, in response to the request, effecting a data change for the subscriber in the SPR. The method further includes, at the SPR, in response to the data change, sending a notification of the change to a policy and changing rules function (PCRF). The method further includes, at the PCRF, in response to the notification of the data change, requesting real time data network usage information from at least one policy and charging enforcement function (PCEF) serving the subscriber. The method further includes, at the PCRF, receiving the data network usage information from the at least one serving PCEF. The method further includes providing an indication of the real time data network usage information to the SPR.

As used herein, the term "real time data network usage information" refers to a snapshot of data network usage information that is current at the time it was obtained. For example, a snapshot of real time date network usage information may be the value of a network usage counter maintained by a PCEF at the time a request for such information is received by the PCEF and after the PCEF has had time to process the request. It is understood that the data network usage information may change at a rate of thousands of bytes per second. Thus, the real time data network usage information obtained using the mechanisms described herein may not be the exact current data network usage count by the time the information is provided back to the subscriber. However, the term "real time data network usage information" is intended to include data network usage information obtained at the request of a subscriber or a network operator that is more current than the data network usage information obtained at the time of the last session termination involving the subscriber.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
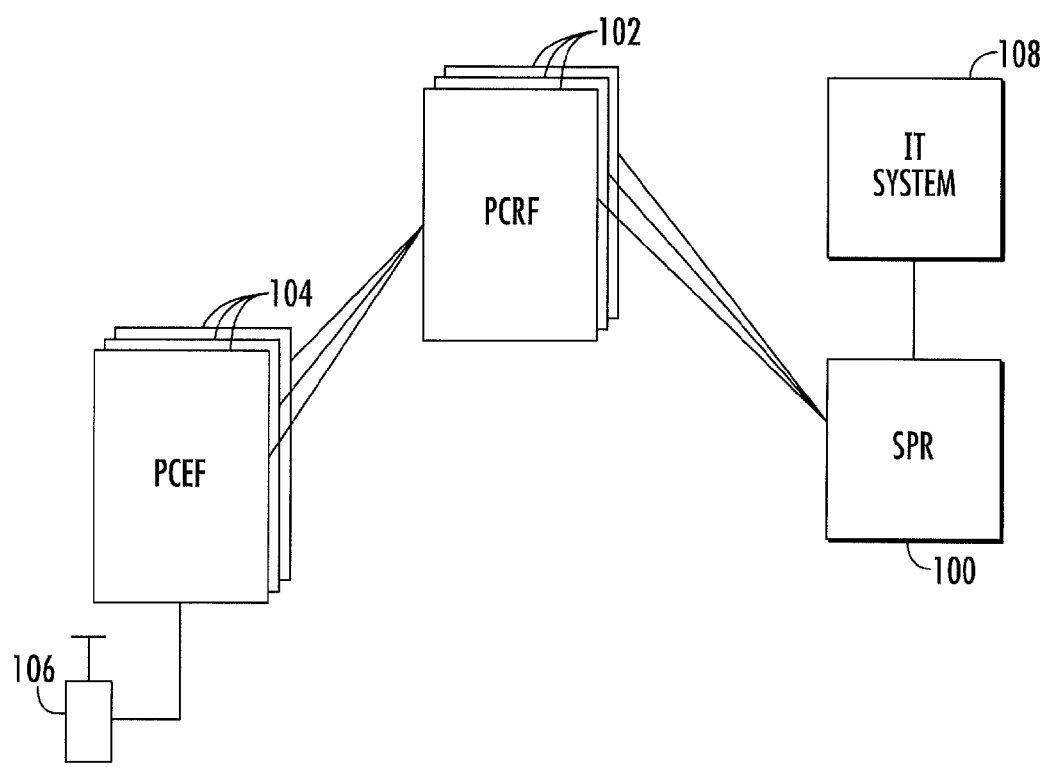
FIG. 1 is a network diagram illustrating a system for providing real time data network usage information using an SPR according to an embodiment of the subject matter described herein.

The subject matter described herein includes methods, systems, and computer readable media for providing real time data network usage information using an SPR. FIG. 1 is a network diagram illustrating an exemplary network architecture in which the subject matter described herein may operate. Referring to FIG. 1, a subscription profile repository (SPR) 100 stores subscription information for data network subscribers. SPR 100 may communicate with one or more policy and charging rules functions (PCRFs) 102 to provide policy information for data network subscribers to PCRFs 102. PCRFs 102 install policies for subscribers on policy and charging enforcement functions (PCEFs) 104. PCEFs 104 maintain data network usage information for subscribers and enforce policies. When a subscriber, such as subscriber 106, desires to obtain real time data network usage information, the subscriber may contact an information technology (IT) system 108 associated with the subscriber's mobile operator or other data network service provider. One possible solution for providing the policy information to the subscriber is to have IT system 108 obtain the information from SPR 100. However, SPR 100 is not updated frequently enough to provide real time data network usage information. Another possible solution is to have IT system 108 obtain the data network usage information directly from a PCEF 104. However, because the PCEF that serves a particular subscriber is dynamically assigned, IT system 108 may not have the visibility to directly contact the PCEF serving the subscriber.

Figure 2:
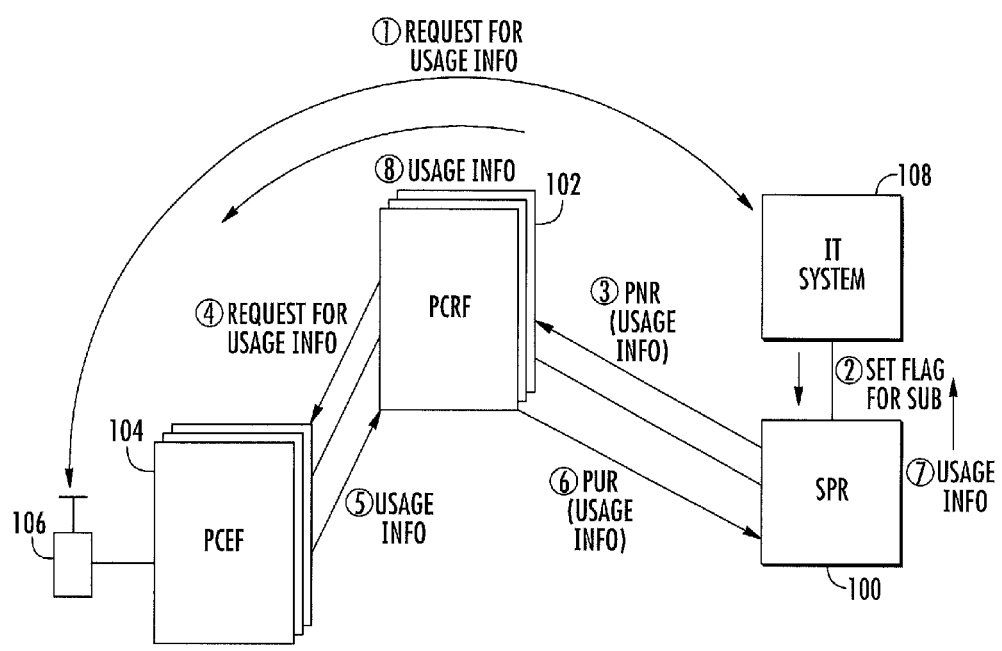
FIG. 2 is a network diagram illustrating an exemplary message flow for providing real time data network usage information using an SPR according to an embodiment of the subject matter described herein.

In light of these difficulties, a mechanism for triggering updating of the data network usage information maintained by SPR 100 is provided. FIG. 2 illustrates a method and system for providing real time data network usage information regarding a subscriber according to an embodiment of the subject matter described herein. Referring to FIG. 2, in step 1, subscriber 106 requests data network usage information from IT system 108. In step 2, IT system 108 sets a flag for the subscriber with SPR 100. Setting a flag in the profile of the subscriber effects a data change in the subscriber's profile. Effecting a data change in the subscriber's profile triggers an existing mechanism of the SPR to notify the PCRF serving the subscriber of the data change. This mechanism is the push notification request (PNR) message sent from SPR 100 to serving PCRF 102. The following illustrates exemplary fields that may be included in a push notification request message:

```
< Push-Notification-Request > ::=    < Diameter
Header: 309, REQ, PXY, 16777217 >
                      < Session-Id >
                      { Vendor-Specific-Application-Id }
                      { Auth-Session-State }
                      { Origin-Host }
                      { Origin-Realm }
                      { Destination-Host }
                      { Destination-Realm }
                      *[ Supported-Features ]
                      { User-Identity }
                      [ Wildcarded-Public-Identity ]
                      [ Wildcarded-IMPU ]
                      [ User-Name ]
                      { User-Data }
```

-continued

```
                *[ AVP ]
                *[ Proxy-Info ]
                *[ Route-Record ]
```

The above illustrated format for the push notification request message is specified by "3rd Generation Partnership Project; Technical Specification Group Core Network and Terminals; Sh Interface Based on the Diameter Protocol; Protocol Details," TR 29.329 (Release 12) (2013), the disclosure of which is incorporated herein by reference in its entirety. In the above illustrated message format, part of the user data AVP may be used to communicate to PCRF 102 that the message is a request for updated data network usage information for the subscriber identified by the subscriber identification field.

The purpose of the PNR request is to notify a Diameter client by a Diameter server of changes in user data maintained by the server. In this instance, SPR 100 is serving as the Diameter server and PCRF 102 is serving as the Diameter client. It should be emphasized that SPR 100 maintains current serving PCRF information for the subscriber and thus it is not necessary for IT system 108 to have direct access to serving PCRF information.

In response to receiving the PNR message, PCRF 102 recognizes the PNR message as a request for real time data network usage information and contacts the PCEF serving the subscriber in step 4. PCRF 102 maintains serving PCEF information for a subscriber because PCRF 102 is the node that installs policies on the PCEF for the subscriber.

PCEF 104 receives the request for usage information and, in step 5, provides the usage information to the serving PCRF 102. PCEF 104 knows the current real time usage count for the subscriber because PCEF 104 enforces policies, including data network usage policies, for the subscriber. Because the usage information was requested in response to the PNR message, rather than waiting for the termination of the data session, PCEF 104 can provide the current usage information, even while the subscriber is participating in one or more data sessions.

In step 6, PCRF 102 provides the real time data network usage information to SPR 100 via a profile-update request (PUR) message. SPR 100 receives the PUR message and, in step 7, provides the real time usage information to IT system 108. The following illustrated exemplary fields may be included in a PUR message:

```
    < Profile-Update-Request > ::=    < Diameter Header: 307,
REQ, PXY, 16777217 >
                < Session-Id >
                { Vendor-Specific-Application-Id }
                { Auth-Session-State }
                { Origin-Host }
                { Origin-Realm }
                [ Destination-Host ]
                { Destination-Realm }
                *[ Supported-Features ]
                { User-Identity }
                [ Wildcarded-Public-Identity ]
                [ Wildcarded-IMPU ]
                [ User-Name ]
                *{ Data-Reference }
                { User-Data }
                *[ AVP ]
                *[ Proxy-Info ]
                *[ Route-Record ]
```

In the above listed example, the PUR message includes a user data AVP value. The user data AVP value may be used to carry the current data network usage information for the subscriber. However, the subject matter described herein is not limited to using a PUR message to communicate the current data network usage information from the PCRF to the SPR. As stated above, any proprietary or non-proprietary message for carrying this information may be used without departing from the scope of the subject matter described herein.

In step 8, IT system 108 provides the real time data network usage information to subscriber 106. Thus, using the steps illustrated in FIG. 2, real time subscriber data network usage information can be provided in response to a request from the subscriber, even while the subscriber is participating in a data session by triggering the SPR to obtain updated data network usage information in real time.

The subject matter described herein is not limited to providing or obtaining real time data network usage information in response to a request from the subscriber. In an alternate scenario, the data or mobile network operator may obtain data network usage information in the real time for the subscriber using the steps illustrated in FIG. 2. One reason that the network operator may desire to obtain this information in real time is so that the network operator can take action if the subscriber is at or near a threshold while the subscriber is participating in one or more data network sessions. For example, the network operator may desire to send the subscriber a message where the subscriber can purchase additional data network capacity if the subscriber's allocation of data network capacity is about to be exceeded. In another example, the data network operator may simply notify the subscriber, while the subscriber is participating in one or more data network sessions, that the subscriber's data network capacity allocation is about to be exceeded.

Figure 3:
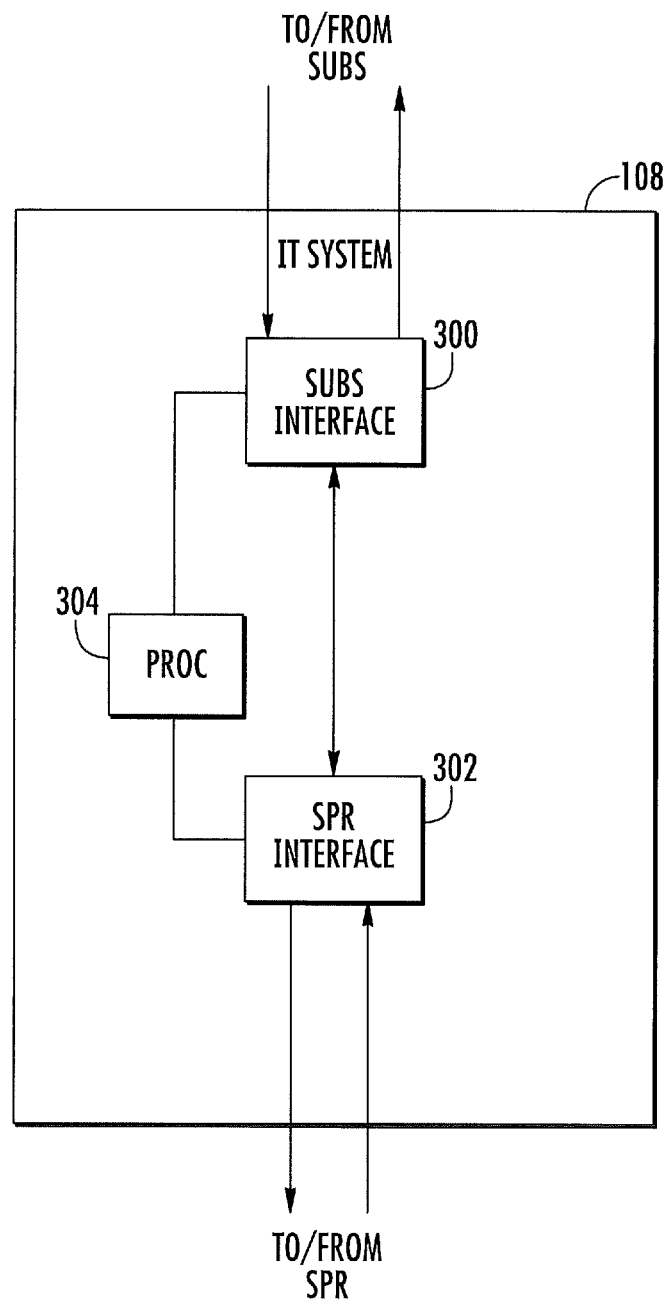
FIG. 3 is a block diagram illustrating exemplary components of an IT system for providing real time data network usage information using an SPR according to an embodiment of the subject matter described herein.

FIG. 3 is a block diagram illustrating an exemplary architecture for IT system 108 for providing real time data network usage information using an SPR according to an embodiment of the subject matter described herein. Referring to FIG. 3, IT system 108 includes a subscriber interface 300 for interfacing with subscribers and an SPR interface 302 for interfacing with an SPR. Subscriber interface 300 may be any suitable interface, such as a hypertext transfer protocol (HTTP) interface for web communications with the subscriber or an interactive voice response (IVR) interface if the subscriber contacts IT system 108 via a telephone call. In another example, subscriber interface 300 may be an SMS interface for communicating with the subscriber via SMS. SPR interface 302 may be any suitable interface through which IT system 108 can effect the data change in SPR 100 that triggers SPR 100 to obtain updated data network usage information for a subscriber. For example, SPR interface 302 may be a database related interface where IT system 108 can effect subscriber data changes by writing data to subscriber profiles stored in the subscriber profile data repository maintained by SPR 100. The components in IT system 108 may be implemented or executed by one or more processors 304.

Figure 4:
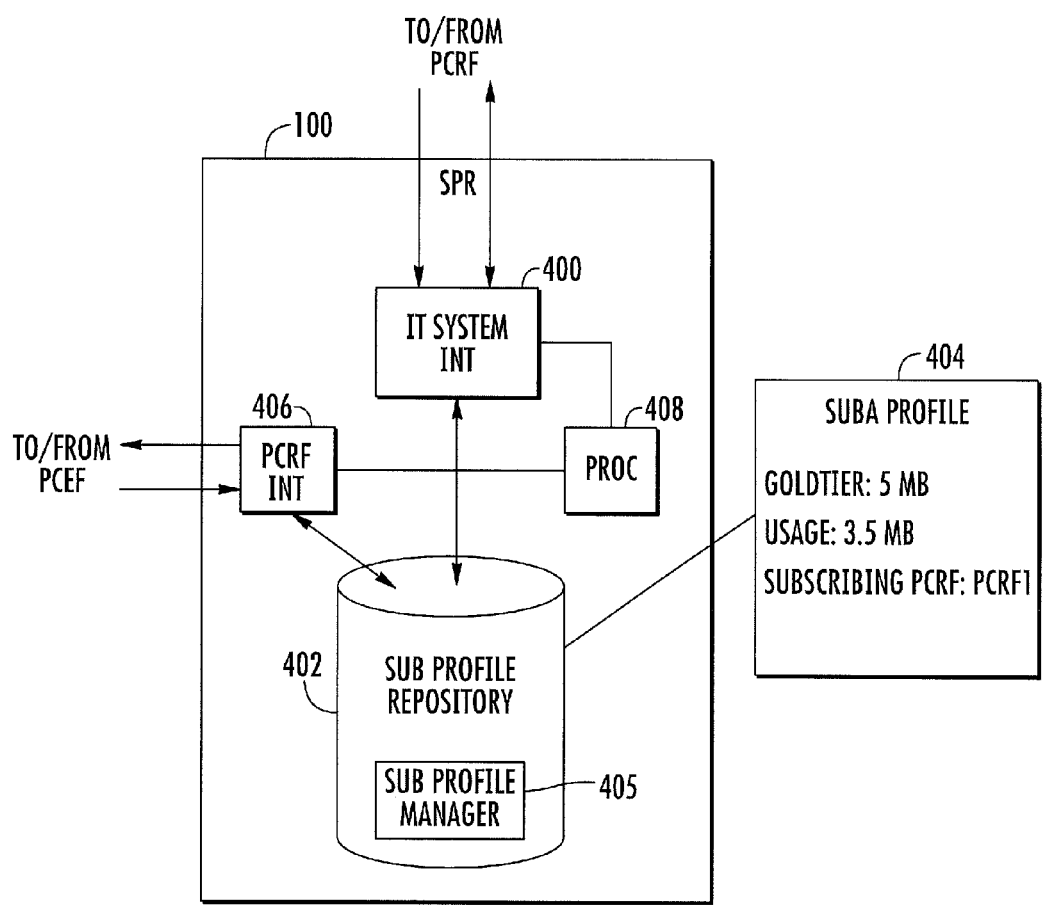
FIG. 4 is a block diagram illustrating exemplary components of an SPR for providing real time data network usage information using the SPR according to an embodiment of the subject matter described herein.

FIG. 4 is a block diagram illustrating an exemplary architecture for SPR 100 for providing real time data network usage information according to an embodiment of the subject matter described herein. Referring to FIG. 4, SPR 100 includes an IT system interface 400 for interacting with IT system 108. IT system interface 400 may receive commands from IT system 108 to effect data changes for subscriber profiles stored in subscriber profile data repository 402. Subscriber profile repository 402 may store profiles for each subscriber. Profile 404 for subscriber A is shown as an example. In the illustrated example, profile 404 includes the data network allowance for the subscriber (5 GB), the data network usage for the subscriber (3.5 GB). SPR 100 may maintain a list of systems that are interested in being notified of the data change. When the user session first started, the serving PCRF retrieves the subscriber profile from the SPR and at that time 'subscribed' to the change notification. The SPR, upon data change, sends notifications to systems that had subscribed previously. In this example, the serving PCRF is PCRF1, which subscribes to receive data change notifications for the subscriber.

As stated above, without some triggering mechanism for updating the data network usage information maintained by SPR 100 more frequently than at session terminations, the usage information stored by SPR 100 may not be reflective of real time data network usage by a subscriber. One exemplary triggering mechanism for triggering updates to the subscriber profile information may be provided by subscriber profile manager 405. Subscriber profile manager 405 may detect changes in subscriber profile data, for example, when such changes are written to a subscriber profile by IT system 108. When such a change occurs, subscriber profile manager 405 may generate the PNR message referenced above for notifying the serving PCRF of the change in subscriber profile data. The PNR message may carry information PCRF 102 recognizes as a request for update subscriber data usage information.

Although the PNR message provides a convenient existing mechanism for obtaining updated subscriber data network usage information, the subject matter described herein is not limited to using the PNR message to obtain this information. In an alternate implementation, a proprietary or other type of message may be sent that the PCRF recognizes as a request for updated network information and that triggers the PCRF to obtain this information.

SPR 100 also includes PCRF interface 406 for communicating with PCRF 102. PCRF interface 406 transmits the request for updated data network usage information to PCRF 102, communicates policy-related subscriber information to PCRF 102, receives updated data network usage information from PCRF 102, and stores the information in subscriber profile data repository 402. The components illustrated in FIG. 4 may be executed or implemented by one or more processors 408.

Figure 5:
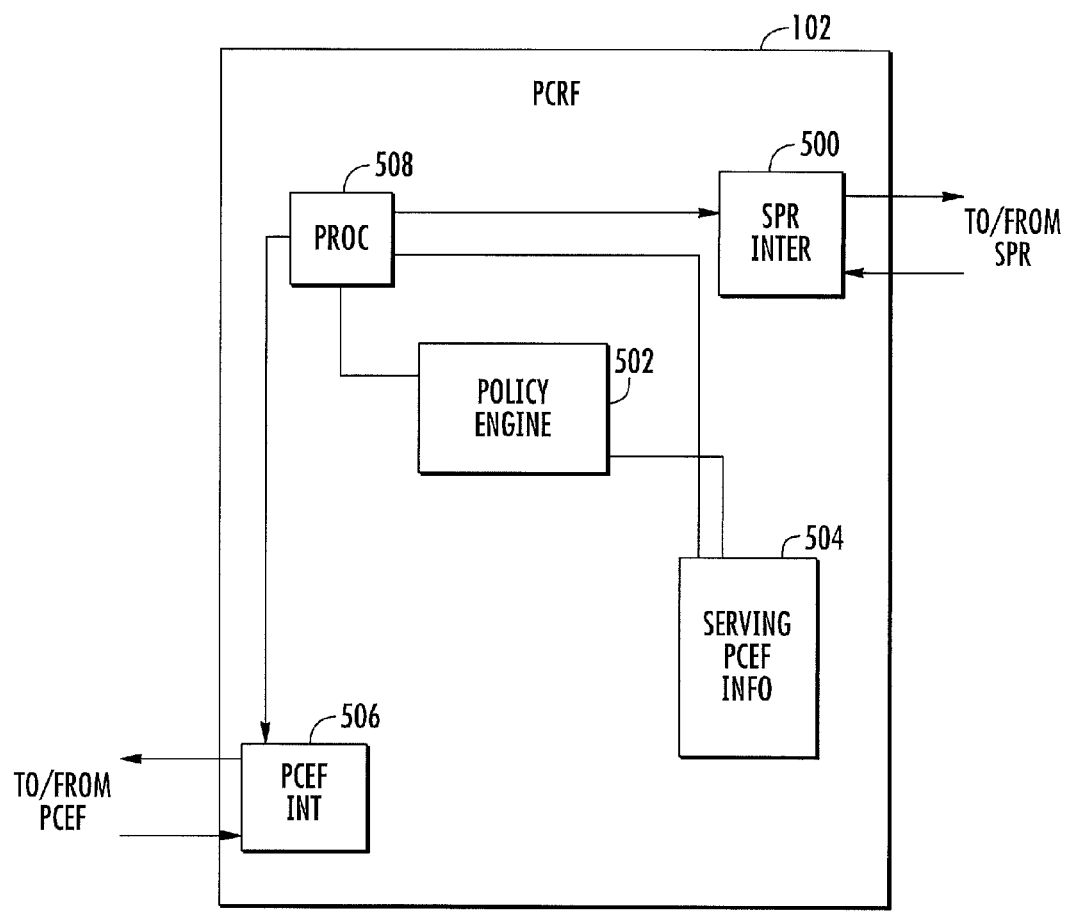
FIG. 5 is a block diagram illustrating exemplary components of a PCRF for providing real time data network usage information using an SPR according to an embodiment of the subject matter described herein.

FIG. 5 is a block diagram illustrating an exemplary architecture for PCRF 102 for providing real time data network usage information using an SPR according to an embodiment of the subject matter described herein. Referring to FIG. 5, PCRF 102 includes an SPR interface 500 for communicating with an SPR 100. SPR interface 500 may receive notifications of data changes from SPR 100 and provide those notifications to policy engine 502. Policy engine 502 processes received messages and determines the appropriate action. Policy engine 502 may also maintain serving PCEF information 504 for a subscriber. PCRF 102 also includes a PCEF interface 506 for communicating with PCEFs 104. PCEF interface 506 may send the request for real time data network usage information to PCEF 104 that is serving a subscriber. One or more processors 508 may implement or execute the components of PCRF 102.

Figure 6:
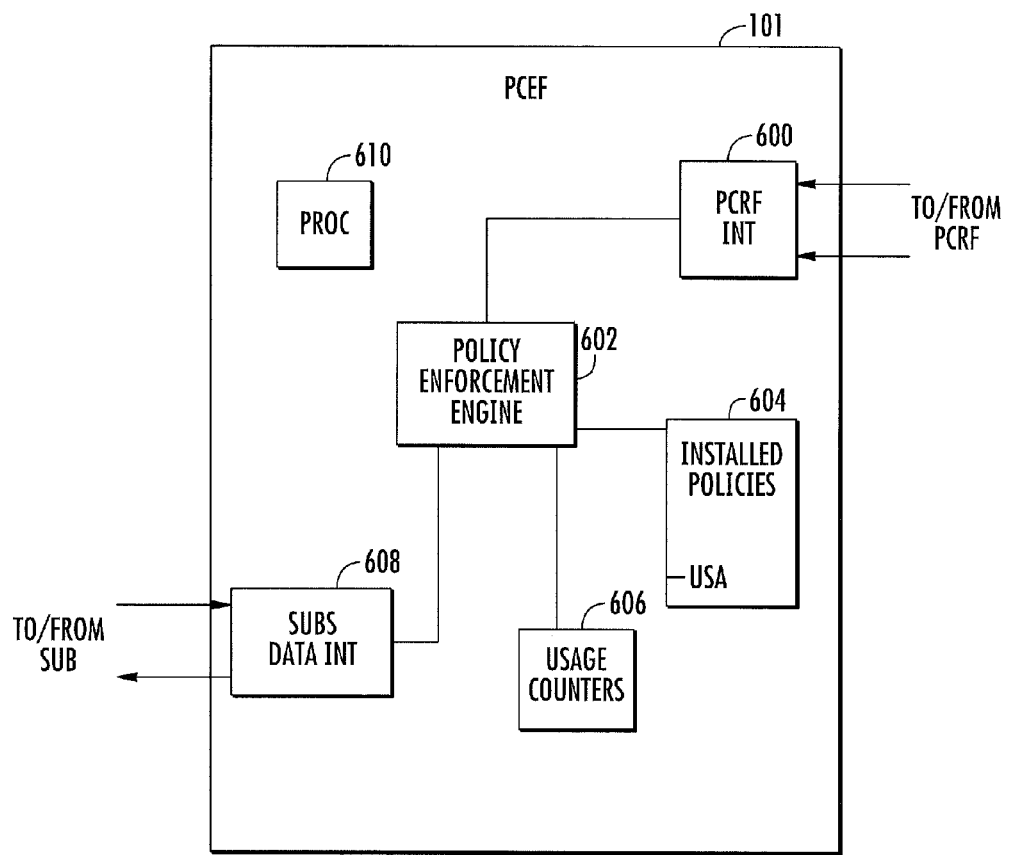
FIG. 6 is a block diagram illustrating exemplary components of a PCEF for providing real time data network usage information using an SPR according to an embodiment of the subject matter described herein.

FIG. 6 is a block diagram illustrating exemplary components of PCEF 104 for providing real time data network usage information using and SPR according to an embodiment of the subject matter described herein. Referring to FIG. 6, PCEF 104 includes a PCRF interface 600 for receiving policies and other messages from PCRF 102. PCEF 104 also includes a policy enforcement engine 602 for enforcing installed policies 604 received from PCRF 102. Policy enforcement engine 602 may also implement usage counters 606 on a per subscriber basis. Usage counter 606 maintains a current count of data network usage by each subscriber for which a policy is installed. PCEF 104 may include a subscriber data interface 608 for sending data to and from a subscriber over a data network connection. One or more processors 610 may implement or execute the components of PCEF 104.

Figure 7:
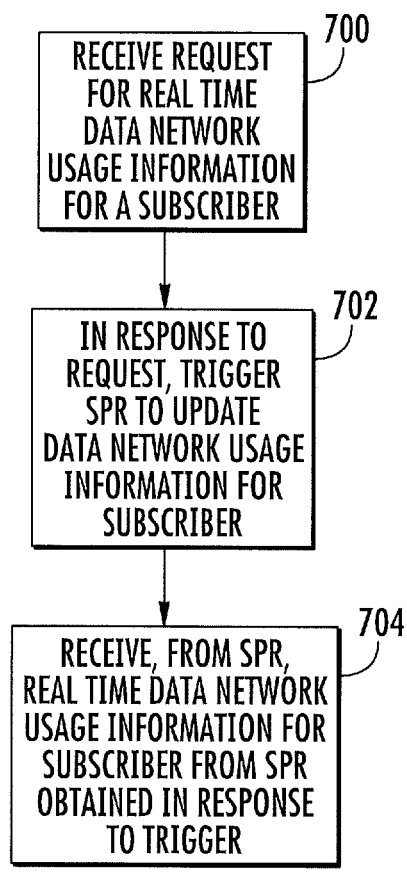
FIG. 7 is a flow chart illustrating exemplary steps performed by an IT system in providing real time data network usage information using an SPR according to an embodiment of the subject matter described herein.

FIG. 7 is a flow chart illustrating exemplary steps performed by IT system 108 in providing real time data network usage information for a subscriber according to an embodiment of the subject matter described herein. Referring to FIG. 7, in step 700, a request for real time data network usage information for a subscriber is received. For example, IT system 108 may receive an SMS message, an e-mail, or a telephone call from a subscriber 106 requesting real time data network usage information for the subscriber. The request may be received while one or more data sessions involving the subscriber are still in progress. Alternatively, the request may originate from the mobile network operator.

In step 702, in response to the request, IT system 108 triggers SPR 100 to update data network usage information for the subscriber. For example, as described above, IT system 108 may set a flag in the subscriber's profile maintained by SPR 100, where the setting of the flag triggers SPR 100 to send a data change notification that will be interpreted by the PCRF as a request usage information for the subscriber. In step 704, the IT system 108 receives real time data network usage information for the subscriber. For example, IT system 108 may receive a message from SPR 100 including real time data network usage information for the subscriber or read from the subscriber profile in the SPR and detect the data change.

Figure 8:
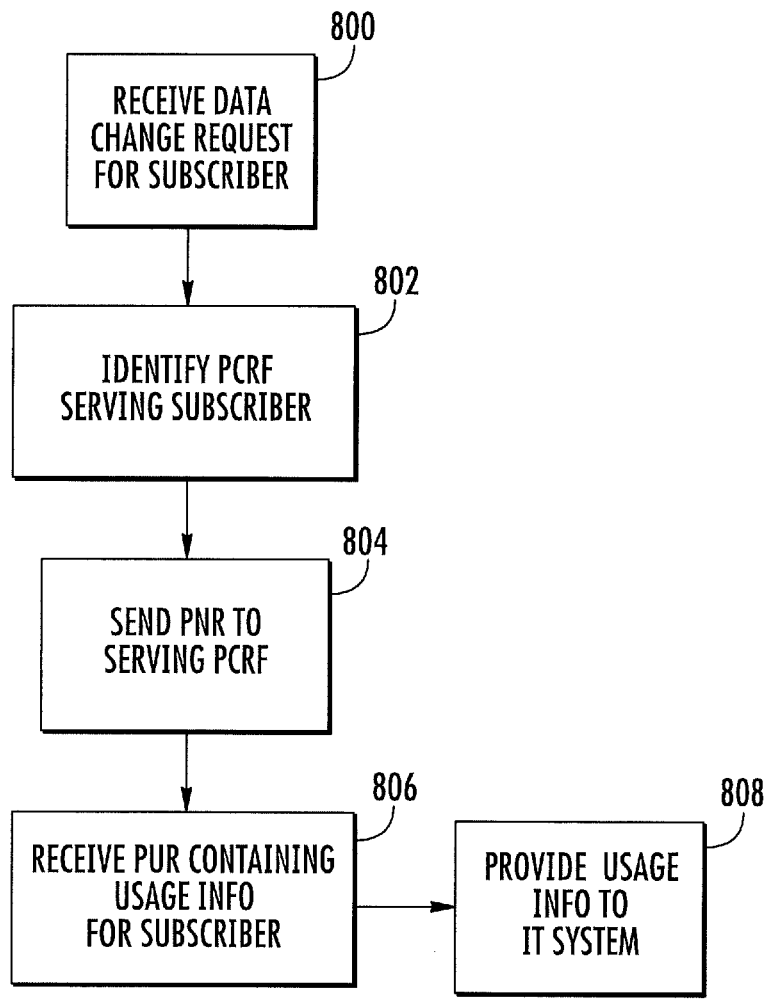
FIG. 8 is a flow chart illustrating exemplary steps performed by an SPR in providing real time data network usage information using the SPR according to an embodiment of the subject matter described herein.

FIG. 8 is a flow chart illustrating exemplary overall steps performed by SPR 100 in providing real time data network usage information regarding a subscriber. Referring to FIG. 8, in step 800, SPR 100 receives a data change request for the subscriber. The data change request may be the message from the IT system 108 for setting a flag in the subscriber's profile. The data change request may trigger the SPR to notify the serving PCRF of the change in data for the subscriber. Accordingly, in step 802, SPR 100 identifies the PCRF serving the subscriber. Step 802 may be performed by analyzing its own state data to determine any PCRFs that are subscribed to receive data change notifications for the subscriber. In step 804, SPR 100 sends a PNR to the serving PCRF. The PNR may contain a parameter recognized by the PCRF as a request for usage information. In step 806, the SPR receives a PUR containing usage information for the subscriber. In step 808, SPR 100 provides the usage information to the IT system.

Figure 9:
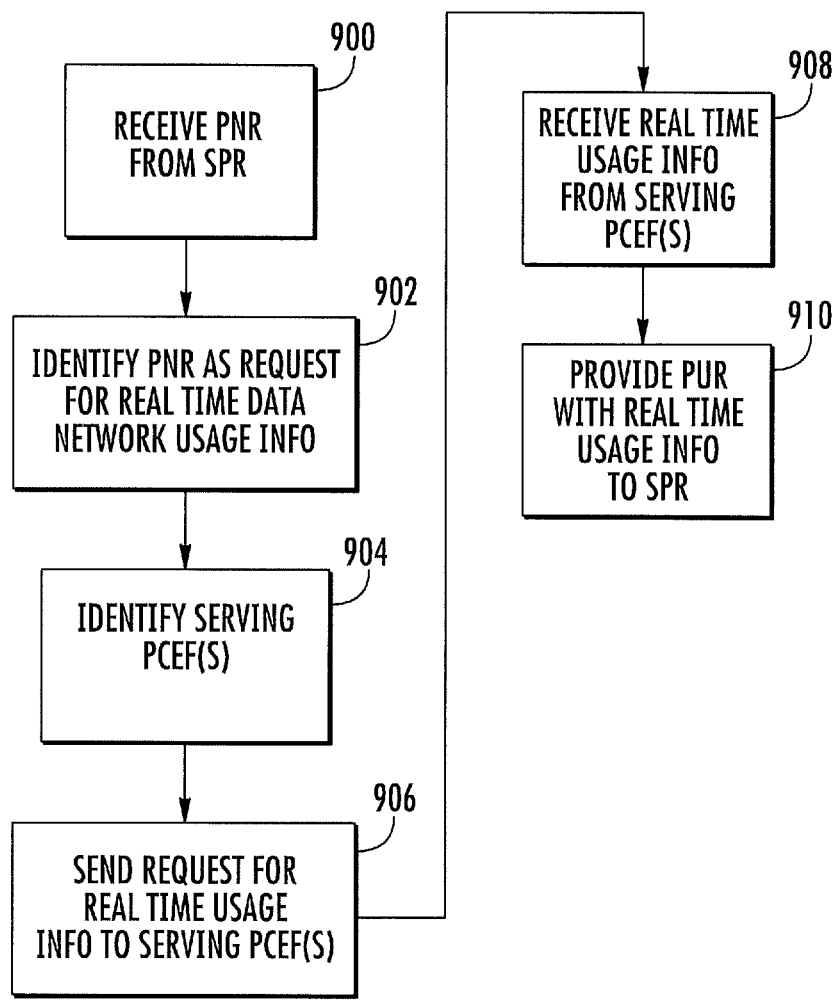
FIG. 9 is a flow chart illustrating exemplary steps performed by a PCRF in providing real time data network usage information according to an embodiment of the subject matter described herein.

FIG. 9 is a flow chart illustrating exemplary steps performed by PCRF 102 in providing real time data network usage information regarding a subscriber. Referring to FIG. 9, in step 900, PCRF 102 receives a PNR from the SPR. In step 902, PCRF 102 identifies the PNR as a request for real time data network usage information for a subscriber. In step 904, PCRF 102 identifies the serving PCEF(s). PCRF 102 may store information concerning the serving PCEF(s) because PCRF 102 is the node that installed the policy for the subscriber on the PCEF(s). In step 906, PCRF 102 sends a request for real time data network usage information to the serving PCEF(s). In step 908, PCRF 102 receives real time data network usage information from the serving PCEF(s) 104, and in step 910 provides SPR 100 with an indication of the real time usage information via a PUR message. If multiple PCEFs are serving a subscriber, PCRF 102 may query each of the PCEFs for the current byte count used by each session involving the subscriber and total the byte counts from all of the serving PCEFs. The indication of the real time network usage information provided in the PUR message may represent the total byte count for all of the user's current data network sessions. Even in the case of a single PCEF serving the subscriber, if the PCEF is only allocated a portion of the subscriber's data network usage quota, e.g., a 100 MB chunk of a 1 GB allocation, the PCRF may total the subscriber's usage of the current chunk with usage from all previously allocated chunks and provide the total to the SPR.

Figure 10:
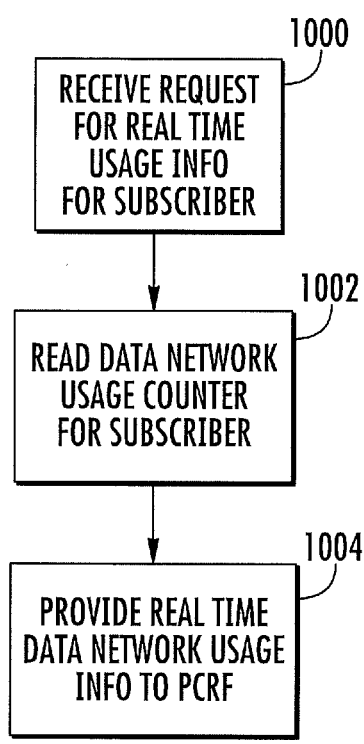
FIG. 10 is a flow chart illustrating exemplary steps performed by a PCEF in providing real time data network usage information using an SPR according to an embodiment of the subject matter described herein.

FIG. 10 illustrates exemplary steps performed by PCEF 104 in providing real time data network usage information regarding a subscriber according to an embodiment of the subject matter described herein. The steps illustrated in FIG. 10 may be performed by each of a plurality of PCEFs that are serving a subscriber at a given time. Referring to FIG. 10, in step 1000, PCEF 104 receives a request for real time usage information for a subscriber. The request may be received while one or more data network sessions concerning the subscriber are in progress. The request may originate from the serving PCRF 102. In step 1002, the PCEF 104 reads a data network usage counter for the subscriber. The PCEF may maintain such counters because the PCEF is required, as part of its policy enforcement function, to maintain such counters. In step 1004, the PCEF provides real time data network usage information regarding the subscriber to PCRF 102. The real time data network usage information may be the current amount of data bytes used by the subscriber while one or more data network sessions involving the subscriber are in progress.

Thus, by triggering updates of data network usage information maintained in the SPR, the subject matter described herein is capable of providing real time data network usage information for a subscriber. The subject matter described herein uses a modification of an existing mechanism to effect the updating of the data network usage information. It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing real time data network usage information for a subscriber utilizing a subscription profile repository (SPR), the method-comprising:
at a policy and charging rules function (PCRF):
subscribing to change notifications for the subscriber at the SPR;
receiving, from the SPR and as a consequence of subscribing to the change notifications for the subscriber at the SPR, a request for real time data network usage information generated by the SPR in response to the SPR receiving a request for real time data network usage for the subscriber;
in response to the request generated by the SPR, requesting real time data network usage information for the subscriber from at least one policy and charging enforcement function (PCEF);
receiving the real time data network usage information from the at least one PCEF; and
providing an indication of the real time data network usage information to the SPR.

2. The method of claim 1 wherein receiving a request for real time data network usage information concerning a subscriber includes receiving the request at an information technology (IT) system of a data network operator.

3. The method of claim 2 wherein receiving the request includes receiving the request via one of a phone call, a text message, or an e-mail from the subscriber.

4. The method of claim 1 wherein effecting a data change for the subscriber in the SPR includes setting a flag in a profile for the subscriber maintained by the SPR.

5. The method of claim 1 wherein sending a message to the PCRF to obtain the real time usage information includes sending a push notification request (PNR) message to the PCRF.

6. The method of claim 1 comprising, at the PCRF, in response to receiving the request, identifying a plurality of PCEFs currently serving the subscriber and querying each of the plurality of PCEFs for a current byte count used by each of a plurality of sessions involving the subscriber and totaling the current byte counts to determine the indication of the real time data network usage information.

7. The method of claim 1 wherein providing the indication of the real time data network usage information to the SPR includes providing usage information to the SPR via a profile update request (PUR) message.

8. The method of claim 1 comprising providing the real time data network usage information from the SPR to an information technology (IT) system that interacts with the subscriber.

9. The method of claim 1 wherein receiving the real time data network usage information from the at least one PCEF includes receiving a byte count from the PCEF reflecting data network usage information for the subscriber and providing the indication of the real time data network usage information while the subscriber is participating in one or more data network sessions without waiting for the termination of the one or more data network sessions.

10. The method of claim 1 wherein the real time data usage information comprises long term evolution (LTE) data network usage information.

11. A system for providing real time data network usage information for a subscriber utilizing a subscription profile repository (SPR), the system comprising:
a policy and charging rules function (PCRF) configured to subscribe to change notifications for the subscriber at the SPR, receive, from the SPR and as a consequence of subscribing to the change notifications at the SPR, a request for real time data network usage information for the subscriber generated by the SPR in response to the SPR receiving a request for real time data network usage for a subscriber, the PCRF further configured to, in response to the request generated by the SPR, request real time data network usage information from at least one policy and charging enforcement function (PCEF), to receive the real time data network usage information from the at least one PCEF, and to provide the real time data network usage information to the SPR.

12. The system of claim 11 wherein the SPR is configured to send a push notification request (PNR) message to the PCRF to trigger the PCRF to obtain the real time data network usage information.

13. The system of claim 11 wherein the PCRF is configured to identify the at least one PCEF serving the subscriber, wherein the PCRF receives data network usage information from the at least one PCEF and determines a total current data network usage count for the subscriber.

14. The system of claim 11 wherein the PCRF is configured to provide the usage information to the SPR via a profile update request (PUR) message.

15. The system of claim 11 wherein the SPR is configured to provide the real time data network usage information to the subscriber by way of an IT system.

16. The system of claim 11 wherein the PCRF is configured to receive a byte count from the at least one PCEF reflecting data network usage information for the subscriber and provide the indication of the real time data network usage information while the subscriber is participating in one or more data network sessions without waiting for the termination of the one or more data network sessions.

17. A non-transitory computer readable medium having stored thereon executable instructions that when executed by the processor of a computer control the computer to perform steps comprising:

at a policy and charging rules function (PCRF):
    subscribing to change notifications for a subscriber at a subscription profile repository (SPR);
    receiving, from the SPR and as a consequence of subscribing to the change notifications for the subscriber at the SPR, a request for real time data network usage information, generated by the SPR in response to the SPR receiving a request for real time data network usage for the subscriber;
    in response to the request generated by the SPR, requesting real time data network usage information for the subscriber from at least one policy and charging enforcement function (PCEF);
    receiving the real time data network usage information from the at least one PCEF; and
    providing an indication of the real time data network usage information to the SPR.

\* \* \* \* \*